United States Patent
Tutihasi et al.

[11] 3,944,332
[45] Mar. 16, 1976

[54] OPTICAL SENSITIZATION AND DEVELOPMENT OF LIQUID CRYSTALLINE DEVICES

[75] Inventors: Simpei Tutihasi; Kyler F. Nelson, both of Pittsford, N.Y.

[73] Assignee: Xerox Corporation, Stamford, Conn.

[22] Filed: July 17, 1974

[21] Appl. No.: 489,954

[52] U.S. Cl. ..................... 350/160 LC; 250/213 R
[51] Int. Cl.² ............................................. G02F 1/13
[58] Field of Search ........... 350/160 LC; 250/213 R; 96/1 R

[56] References Cited
UNITED STATES PATENTS

| | | | |
|---|---|---|---|
| 3,642,348 | 2/1972 | Wysocki et al. | 350/160 LC |
| 3,732,429 | 5/1973 | Braunstein et al. | 350/160 LC X |

*Primary Examiner*—Alfred E. Smith
*Assistant Examiner*—Matthew W. Koren
*Attorney, Agent, or Firm*—James J. Ralabate; Michael H. Shanahan; George J. Cannon

[57] ABSTRACT

Increased sensitization of liquid crystalline devices utilizing current flow to provide a change in optical characteristics is provided by sandwiching a photoconductive layer between an insulating layer and a liquid crystalline layer wherein all three layers are placed between two electrodes. The sandwich device is utilized in an imaging method wherein an electrical potential is applied across said device, a bias or sensitizing light is utilized to bring the device up to the threshold for gain photocurrent and then removed, and wherein a subsequent light is utilized to gate or initiate gain photocurrent. Alternatively, the biasing light may be in imagewise configuration which forms a latent image in which case the subsequent light can be a uniform exposure which gates the gain photocurrent, thereby developing the latent image.

30 Claims, 3 Drawing Figures

OPTICAL SENSITIZATION AND DEVELOPMENT OF LIQUID CRYSTALLINE DEVICES

BACKGROUND OF THE INVENTION

This invention relates to electro-optical elements containing a photoconductive layer and a liquid crystalline layer, and more particularly to improving the sensitivity of such electro-optical elements by including an insulating layer in contact with the free side of said photoconductive layer.

As described in U.S. Pat. No. 3,592,527, it has been found that useful visual display devices can be produced which contain as a visual image forming element thereof a multilayer structure composed of a layer or film of a liquid crystalline material overlying a layer of a photoconductive composition.

The photoconductive properties of conventional photoconductive materials and layers containing photoconductive materials have been described in detail in the literature, for example, Schaffert, Electrophotography, published by Focal Press Limited, 1965. One property of photoconductors is the creation of primary current under the influence of an applied field when the photoconductive material is struck by photons of light. Heretofore, it has been generally felt necessary that ohmic contact, i.e., a reservoir of charge at a metal-photoconductor interface, must be present in order to obtain a quantum efficiency greater than 1 wherein photoconductive current greater than the primary current (commonly called gain photocurrent) is obtained. Further, it has been generally felt that with a blocking contact to the photoconductor, e.g., a non-ohmic contact with a Schottky barrier at the metal-photoconductor interface, photoconductive gains greater than unity could not be achieved. See, for example, "Photoconductive Gain Greater than Unity in Cadmium Selenide Films with Schottky Barriers at the Contacts," R. R. Mehta and B. S. Sharma, *J. Appl. Phys.*, 44, 1, January, 1973

According to this article, the authors were able to achieve a photoconductive gain greater than unity with gold electrodes in contact with the photoconductor wherein the gold contacts were determined to be non-ohmic with a Schottky energy barrier between the electrode and the photoconductor and wherein the radiation utilized was bandgap radiation of the photoconductor. No insulating layer was deliberately inserted between the gold electrode and photoconductor.

Conduction through a physical, electrically insulating barrier is reported in "Thermally Assisted Tunneling in Dielectric Films,"G. G. Roberts and J. I. Polanco, *Phys. Stat. Sol. (a)*, 1, 409 (1970). In the latter article, the authors reported findings in the characteristic relationship between current flow in, and voltage applied to, an insulating organic layer sandwiched between two electrodes. No photoconductive layer is utilized and no mention of gain photocurrent.

Conduction through a semi-conductor layer adjacent a few-atoms-thin layers of insulating materials is theoretically presented in "The Physical Review B,"F. Schmidlin, 1, 4, pages 1583–1587 (1970).

U.S. Pat. No. 3,732,429 discloses the use of an inorganic insulating layer in contact with a photoconductor in order to obtain a higher dark impedance in conjunction with a liquid crystalline layer. All three layers are sandwiched between electrodes.

In new and growing areas of technology, new methods, apparatus, compositions and articles of manufacture are often discovered for the application of the new technology in a new mode. The present invention relates to a new and advantageous method for providing increased current flow from a photoconductor into and through a liquid crystalline layer thereby allowing the utilization of less light in optically imaging electro-optic devices containing a photoconductive layer in contact with the liquid crystalline layer wherein the liquid crystalline layer undergoes electro-optical changes due to current or charge flow. That is, the optical sensitivity of such systems is increased.

SUMMARY OF THE INVENTION

It is, therefore, an object of the invention to provide increased optical sensitivity to electro-optic devices containing a photoconductive layer in contact with a liquid crystalline layer.

It is another object of this invention to provide a novel method of imaging said electro-optic devices.

It is yet a further object of this invention to provide a novel method of developing said electro-optic devices.

The following objects and others accomplished in accordance with the present invention by providing an insulating layer in contact with the free side of the photoconductive layer, the photoconductive layer having its other side in contact with a liquid crystalline layer, all three layers being placed between a pair of electrodes. The thickness ratio of the photoconductive layer to the insulating layer is at least about 10 to 1. Surprisingly, it has been found that charge from the primary current within the photoconductor accumulates at the photoconductorinsulator interfaces. This charge accumulation creates an electrical field which is sufficient to cause tunneling of charges from the electrode in contact with the insulating layer into the insulating layer and through the electro-optical device. This tunneling charge presents a gain in photocurrent injected into the liquid crystalline device and this phenomena is utilized in accordance with the present invention to provide a novel method of imaging these devices and a novel method of developing these devices.

In accordance with the method of the present invention, a biasing light of an intensity insufficient to substantially immediately create the gain photocurrent is utilized to create a primary photocurrent which in time causes the accumulation of charges to build up to the threshold point where gain photocurrent is about to be promoted. This biasing light is then turned off and, in effect, has sensitized the electro-optic device because a small quantity of light subsequently striking the photoconducter will create enough additional charge accumulation to gate or initiate gain photocurrent. The gain photocurrent produced by the subsequent light flows through the liquid crystalline layer thereby changing at least one of its electro-optical properties. In accordance with the method of the present invention, the imagewise optical input can be provided either in the form of the biasing light or in the form of the subsequent gating light. In the former case, the imagewise configured biasing light creates an electrical field across the insulating layer due to an accumulation of charges at the interface of the insulating layer and photoconductive layer in imagewise configuration corresponding to the configuration of the biasing light. This accumulation of charges is, in effect, a latent image because when a subsequent uniform gating light strikes the photoconductor, the threshold value of charge accumulation sufficient to initiate gain photocurrent will occur only in those areas previously accumulating charge due to the imagewise configured biasing light.

On the other hand, the biasing light may be uniformly directed upon the electro-optical device and the interface between the insulating layer and photoconductive layer can therefore be uniformly brought to the level of accumulated charge whereat gain photocurrent is about to be initiated upon subsequent illumination by the gating light. In this case, however, the subsequent gating light is in imagewise configuration and initiates gain photocurrent in regions of the insulating layer-photoconductive layer interface corresponding to the configuration of the subsequent gating light.

In the latter case, the electro-optical device is first sensitized uniformly and then imagewise developed due to the creation of gain photocurrent. In the former case, the electro-optical device is first latently imaged and then subsequently developed by uniform exposure to a gating light which "develops out" only the imagewise sensitized areas of the electro-optical device.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Gain Photocurrent Effect

Figure 1:
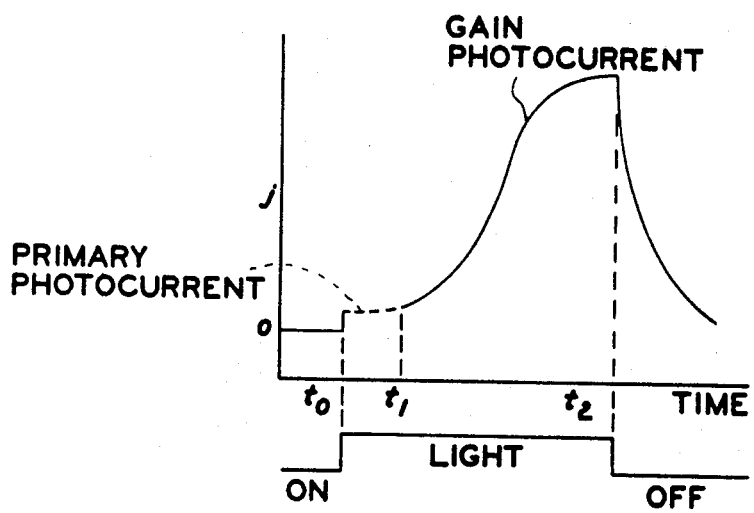
FIG. 1 is a graphical illustration of a representative plot of the behavior of photocurrent versus time in relation to excitation light which occurs in the photoconductive layer in contact with an insulating layer which is utilized in the practice of this invention.

FIG. 1 generally illustrates the typically observed photocurrent behavior in time in conjunction with an excitation light. This behavior is surprisingly observed when an insulating layer is placed in contact with the photoconductive layer (the thickness ratio of photoconductive to insulating layer being at least about 10 to 1) and the combined layers are sandwiched between two electrodes, and, this effect is typically observed when a liquid crystalline layer is inserted between the photoconductive layer and the electrode with which the photoconductive layer was previously in contact. At time equal $t_o$, the excitation light is turned on and one observes a steady state primary photocurrent. At time equal $t_1$, the photocurrent enters into the gain mode and increases until it reaches a maximum gain current. At time equal $t_2$, the excitation light is turned off; the current decreases, eventually returning back to the original current level. Through experimentation, it has been determined that the total charge conducted through the photoconductor before the onset of the gain photocurrent or secondary current is substantially constant and is not significantly affected by variations in thicknesses of the layers, the value of the applied voltages, the value of the light intensities, and the identity of the photoconductive materials. On the other hand, the total primary current charge accumulated prior to the onset of gain photocurrent has been observed to be variable with, or affected by, the work function of the insulating layer material, and temperature. It should be mentioned that for temperatures in the range of about 0° to about 20°C the amount of total primary current accumulated prior to the onset of gain photocurrent becomes larger. Also, at temperatures from about 40°C to about 60°C the amount of total primary current charge accumulated prior to the onset of gain photocurrent becomes smaller than the value at room temperature.

The amount of charge accumulation at $t_1$ due to primary current is referred to herein as the "charge threshold for gain photocurrent."

It has been observed through experimentation that the gain photocurrent is significantly affected by the work function of the electrode in contact with the insulating layer, the identity of the insulating material but not the thickness of the insulating layer; the applied electrical field, the identity of the photoconductive material; the intensity of excitation light; and, temperature. The variation of gain photocurrent with these parameters are illustrated in the examples set forth below.

In operation, the gain photocurrent can be provided by applying a voltage across the electro-optic device and while the voltage is applied, impinging said device with light having a wavelength within the fundamental absorption band of the photoconductive material in the photoconductive layer and which excites a primary photocurrent in the photoconductive layer. So long as a primary current is created in the photoconductive layer by impingement of the excitation light, the intensity of the excitation light and the magnitude of the applied voltage can be any preselected value desired. Eventually, with time, the total primary current charge accumulated will become sufficiently great to initiate gain photocurrent. That is, the "charge threshold for gain photocurrent" is reached. These matters are described in more detail in an Application for Patent entitled "Injection Current Device and Method" by Simpei Tutihasi, U.S. Ser. No. 489,285, filed July 17, 1974.

In accordance with the present invention, an electro-optic device comprising a photoconductive layer in contact with a liquid crystalline layer is imaged with increased sensitivity by including an insulating layer in contact with the photoconductive layer and an electrode; the photoconductive layer being at least about 10 times as thick as the insulating layer; and, sequentially impinging the electro-optic device with two lights. The first light is referred to herein as the "biasing light" which impinges the electro-optic device until the total primary photocurrent charge accumulated is at, but just below, the charge threshold for gain photocurrent. At this point, the biasing light is turned off. Subsequently, the electro-optic device is struck with a second light which is herein referred to as a "gating" light. The function of this gating light is to initiate gain photocurrent by bringing the total primary current charge accumulated to at least the value of the charge threshold for gain photocurrent.

The nature of the sensitivity which is imparted to the electro-optic device by the inclusion of such an insulating layer is that of quantum gain. Light is physically viewed as possessing the characteristics of wave motion and energy particles. The characteristic of an energy particle is generally attributed to the photon quantum light. Generally speaking, when a photon quantum of light strikes a photoconductive material; one pair of charge carriers constituting a negative charge and a positive charge is created. Typically, one of the charge carriers of the pair charge carriers moves in the photoconductor when the photoconductive material is subjected to an electrical field. It has been found that when light strikes a photoconductor, one photon quantum of light is required to generate one pair of charge carriers. Thus, the maximum quantum efficiency, expressed as the number of charge carrier pairs created per photon quantum of light has a maximum value of 1. Typically the quantum efficiency is less than 1.

The inclusion of an insulating layer having the requisite relative thickness to the photoconductive layer, and utilized in accordance with the practice of this invention allows the buildup of charges from the primary photocurrent until the accumulation is sufficiently great to strip charges from the electrode in contact with the insulating layer and gives them such a velocity that the charges travel through the electro-optic device and the associated electrical circuitry. This phenomena is referred to as tunneling and is believed to involve the phenomena of thermally assisted tunneling. The tunneling charges make many loops through the electro-optic device and associated circuitry and therefore provide an effective quantum efficiency many times that of unity. In this sense, then, the sensitivity of the electro-optic device is increased since there is more charge flow through the electro-optic device per photon quantum of light. This tunneling of charges through the device is what provides the gain photocurrent.

The Electro-Optic Device

Figure 2:
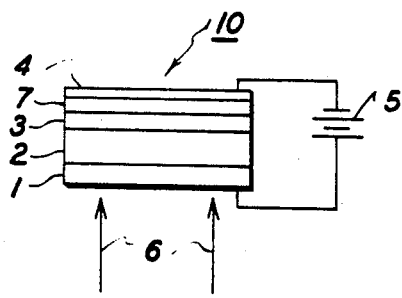
FIG. 2 is a schematic illustration of an electro-optical device of the type comprising a photoconductive layer in contact with a liquid crystalline layer which is improved in accordance with the practice of this invention by the addition of an insulating layer which increases the sensitivity of the electro-optic device.
Figure 3:
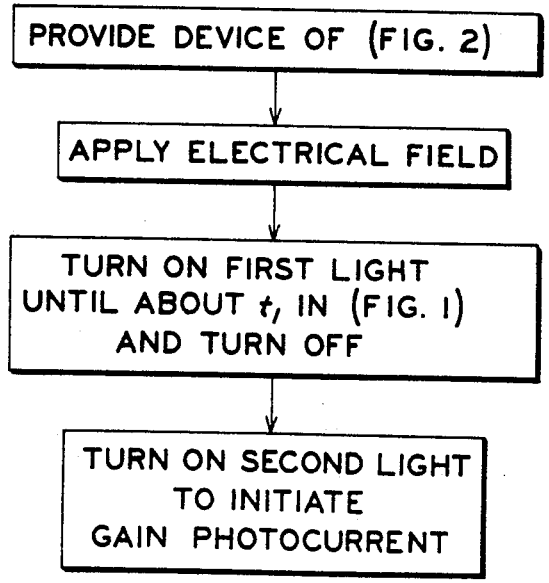
FIG. 3 is a block diagram of the general steps utilized in the method of the present invention.

Referring now to FIG. 2, the electro-optic device utilized in the present invention is generally represented as 10. The device comprises electrodes 1 and 4, insulating layer 2, liquid crystalline layer 7, and photoconductive layer 3.

Electrodes 1 and 4 may comprise any suitable material which allows the provisioning from voltage source 5 of an electrical field across insulating layer 2, photoconductive layer 3, and liquid crystalline layer 7. Typical suitable materials include metals such as platinum, aluminum, gold, copper, indium, gallium; and conductive metal oxides such as, for example, tin oxide, indium oxide; and insulating substrates coated with conductive layers such as NESA glass comprising a thin coating of tin oxide over glass and commercially available from Pittsburgh Plate and Glass Company. Any suitable electrode material can be utilized. However, in particularly preferred embodiments of the invention when characteristics of the photoconductive layer, electrodes and insulating layer are preferably matched in order to provide even a greater gain in photocurrent, the work function of the electrode material is selectively chosen to match the characteristics of the photoconductive layer and the insulating layer. This is not required in order to practice the invention, nor is it of major consequence with respect to the electrode in contact with the liquid crystalline layer. However, when greater or optimum gain photocurrent is desired, it is useful to ensure that the electrode in contact with insulating layer does have an appropriate work function value in the particular insulating layer and photoconductive layer utilized. "Work function" or derivations thereof is used herein to the conventional sense well known to those skilled in the art; and "high work function" is used herein to designate materials which have a work function at or above 4.5 eV while "low work function" is used herein to refer to materials which have a work function below about 4.5 eV. The electrode through which the biasing and the gating light pass in impinging upon the device should be at least partially transparent to such light. Semi-transparent electrodes, that is, those sufficiently thin to allow about 50% of the light striking the electrode to pass through the electrode are satisfactory.

Insulating layer 2 can comprise any suitable electrically insulating material. Such layers may include insulating inorganic materials such as, for example, metallic oxides which are nonconductive and may include insulating organic materials. Any suitable insulating organic material may be used. Typical insulating organic materials include: poly(2-propene-anthracene), poly(2-vinyl-anthracene), poly[1-(2-anthryl)ethylmethacrylate], phenoxy resin — a high molecular weight thermoplastic copolymer of bisphenol A and epichlorohydrin having the basic molecular structure — $[OC_6H_4C(CH_3)_2C_6H_4OCH_2CH(OH)CH_2]_n$ where $n$ is equal to about 100 (the foregoing material being representative of insulating materials having a low ionization potential of below about 8 eV) polystyrene, polyvinylcarbazole, polyethylene, polycarbonate resins such as, for example, LEXAN — a thermoplastic carbonate linked polymer produced by reacting bisphenol A with phosgene, available from General Electric Company, the various parylenes such as poly-para-xylylene and poly-monochloro-paraxylylene, a 65/35 weight percent copolymer of styrene and n-butylmethacrylate, a 70/30 weight percent copolymer of styrene and hexylmethacrylate (the foregoing being representative of insulating materials having "high" electron affinity of above about 1.5 eV).

It will be understood, of course, that any suitable insulating layer may be used regardless of the value of its ionization potential. However, for particularly preferred embodiments mentioned above and which will be described below, the ionization characteristics of the material utilized in the insulating layer 2 is appropriately matched with the characteristics of the photoconductive layer and the work function of the electrodes. Other typical suitable insulating materials for insulating layer 2 include: classes of materials such as polystyrenes, alkyd substituted polystyrenes, polyolefins, styrene acrylic copolymers, styrene-olefin copolymers, silicone resins, phenolic resins, and organic amorphous glasses. Typical suitable materials include Staybelite Ester 10, a partially hydrogenated rosin ester, Foral Ester, a hydrogenated rosin triester, and Neolyn 23, an alkyd resin, all from Hercules Powder Co., SR 82, SR 84, silicone resins, both obtained from General Electric Corporation; Velsicol X-37, a polystyrene-olefin copolymer from Velsicol Chemical Corp.; hydrogenated Piccopale 100, a highly branched polyolefin, HP-100, hydrogenated Piccopale 100, Piccotex 100, a copolyer of methyl styrene and vinyl toluene, Piccoelastic A-72, 100 and 125, all polystyrenes, Piccodiene 2215, a polystyrene-olefin copolymer, all from Pennsylvania Industrial Chemical Co., Araldite 6060 and 6071, epoxy resins of Ciba; Amoco 18, a poly alpha-methylstyrene from Amoco Chemical Corp.; ET-693, and Amberol ST, phenol-formaldehyde resins, ethyl cellulose, and Dow C4, a methylphenylsilicone, all from Dow Chemical; R5061A, a phenylmethyl silicone resin, from Dow Coring; Epon 1001, a bisphenol epichlorohydrin epoxy resin, from Shell Chemical Corp.; and PS-2, PS-3, both polystyrenes, and ET-693, a phenol-formaldehyde resin, from Dow Chemical; and Nirez 1085 a polyterpene resin, available from Tenneco Corporation under that tradename.

Photoconductive layer 3 may comprise any suitable photoconductive material. Typical suitable photoconductive materials include photoconductive inorganic materials and photoconductive organic materials. Typical suitable inorganic photoconductive materials include sensitized zinc oxide, for example, sensitized by the addition of Rodamine Dye, available from Dupont, selenium, selenium alloy with arsenic such as, for example, arsenic triselendide, tellurium, antimony or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which patents are hereby incorporated by reference. Typical suitable organic photoconductive materials include, for example, the combination of 2,5-bis(p-aminophenyl)-1, 3,4-oxadiazole available under the trademark TO 1920 from Kalle and Company, Weisbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinylcarbazole, available under the trademark Luvican 170 from Winter, Wolf and Company, New York, New York. The thickness of the photoconductive layer 3 is not critical to the practice of the invention and any thickness which provides gain photocurrent may be utilized.

As previously stated, any combination of materials for electrodes 1 and 4, insulating layer 2 and photoconductive layer 3 may be utilized to obtain gain photocurrent in accordance with the present invention. However, enhanced results are obtained in particularly preferred embodiments when the characteristics of the electrodes, insulating layer and photoconductive layer are matched. The matching of these characteristics are as follows. When the photoconductive material preferentially conducts positive charge or holes to a greater extent than it conducts negative charge or electrons, then the electrode material is preferentially selected to have a high work function greater than about 4.5 eV and the insulating layer preferentially has a low ionization potential of below about 8 eV. On the other hand, when the photoconductive layer preferentially conducts electrons to a greater extent than it conducts holes, then the electrode preferentially has a low work function of below about 4.5 eV and the insulating layer preferentially has a high electron affinity greater than about 1.5 eV.

Exemplary photoconductive materials which preferentially conduct positive charges over negative charges include, for example, the photoconductive alloys such as, for example, arsenic triselenide and organic materials such as, for example, sensitized polyvinyl carbazole with selenium or selenium alloys or dyes. Exemplary examples of photoconductive materials which preferentially conduct negative charges over positive charges include sensitized zinc oxide in a binder and photoconductive sulfur containing compounds such as, for example, cadmium sulfide and cadmium sulfo-selenide. Ambipolar photoconductive materials, that is, those which conduct positive and negative charges with equal facility and exhibit no preferential conduction include, for example, selenium and selenium alloys doped with small amounts of arsenic, and polyvinyl carbazole containing a large amount of 2,4,7-trinitro-9-fluorenone. As indicated above, ambipolar materials may be satisfactorily employed in the practice of the present invention.

Liquid crystalline layer 7 may comprise a layer of any suitable liquid crystalline material or composition which has at least one optical property or characteristic which changes when such liquid crystalline material or composition is subjected to voltage. Such liquid crystalline materials include any liquid crystalline imaging layer or system which can be imaged by application of a voltage which subjects the layer to either an electrical field, current or charge carrier flow, or the capture of charges such as, for example, that of U.S. Pat. No. 3,645,729, hereby incorporated by reference.

The changes in liquid crystalline materials brought about by current flow include dynamic scattering typically associated with nematic liquid crystalline materials; turbulent scattering typically associated with cholesteric liquid crystalline materials and mixtures of nematic and cholesteric liquid crystalline materials; the texture change in a cholesteric liquid crystalline material from the Grandjean texture to the focal-conic texture upon cessation of current flow; and, the formation of Williams Domains in nematics and domains similar to Williams Domains in mixtures of nematics and cholesterics. Such domains are well known to those skilled in the art and are known to possess a periodicity suitable for the diffraction of light.

Typical suitable liquid crystalline field-effects include, for example, the optically negative to optically positive phase transformation disclosed in U.S. Pat. No. 3,652,148 hereby incorporated by reference; the twisted nematic to nematic transformation disclosed in U.S. Pat. No. 3,731,986, hereby incorporated by reference; the Grandjean to focal-conic texture transformation disclosed in U.S. Pat. No. 3,642,348, hereby incorporated by reference; and the nematic field-effects such as, for example, the uniaxial to biaxial transformation disclosed in U.S. Pat. No. 3,687,515, hereby incorporated by reference. Generally speaking, liquid crystalline field-effects are obtained in accordance with the practice of the present invention provided (1) the photoconductor has a dark resistance sufficiently greater than that of the liquid crystalline material such that the electrical field which resides across the liquid crystalline material in the dark is below that resuired for imaging, and (2) in the presence of light, the resistance of the photoconductor is decreased to a value sufficiently low such that an electrical field is produced across the liquid crystalline material sufficient to produce the field-effect.

Further, the liquid crystalline materials and compositions, including the mixtures of smectic and cholesteric liquid crystalline materials which undergo the texture change in U.S. Pat. No. 3,671,231 can be utilized and can, as described therein, include a change in the translucency of the liquid crystalline imaging material, a change of color of the transformed areas, or by a change in the optical characteristics, such as birefringence, optical acitivity, and circular dichroism, of the liquid crystalline composition.

Compositions involving a texture change are suited for viewing, typically with reflected light; however, where the device of FIG. 2 is provided in substantially transparent form, the compositions having texture changes can be viewed in transmission.

In summary, the liquid crystalline layer 7 of the electro-optic device of FIG. 2, herein, can comprise any of the liquid crystalline materials and compositions enumerated in the above-referenced patents. Accordingly, dynamic scattering, turbulent scattering, Grandjean to focal-conic texture changes including either optically active nonmesomorphic materials or smectics or nematics, or mixtures thereof, can be imaged by the method of the present invention.

The method of the present invention images liquid crystalline layer 7 by creating a gain photocurrent in imagewise configuration which alters the amount of current and the electrical field across the liquid crystalline layer. Since the gain photocurrent is created herein by impinging the imaging device of FIG. 2 sequentially with a biasing light and then a gating light, it will be appreciated that either the biasing light or the gating light can be in imagewise configuration.

Since, as described herein, the phenomenon of primary photocurrent charge accumulation occurs with the pulsed light as well as continuously impinging light, the biasing light may be either pulsed or continuous. Similarly, since the gating light causes the accumulation of additional charges which together with the charges accumulated due to the biasing light at least equals or exceeds the charge threshold for gain photocurrent, the gating light may be either pulsed or continuous.

Excitation light 6 of FIG. 2 may be directed to impinge the device by passing same through either of electrodes 1 and 4. Of course, the electrode through which the excitation light 6 passes should be at least partially transparent to said light. Excitation light 6 is representative of both the biasing light and the gating light, should be within the fundamental absorption band of the photoconductive material of photoconductive layer 3 and should excite a primary photocurrent within photoconductive layer 3. Since the baasing light and the gating light have these characteristics in common, both may be provided by a single light source. However, they are not functionally equivalent in the method of the present invention because the function of the biasing light is to bring the device up to about the charge threshold for gain photocurrent whereas the gating light causes the device to achieve the charge threshold for gain photocurrent and thereby initiate gain photocurrent.

As previously described above, the biasing light may uniformly impinge the device of FIG. 2 to thereby "sensitize" the device and allow rapid onset of gain photocurrent by subsequent impingement of gating light. For example, the device of FIG. 2 can be thus sensitized and imaged by a cathode ray tube (CRT). The response to the CRT of any other intense, short duration light source would be rapid because light given off by the phosphorous screen of the CRT or given off by other light sources would be sufficient to rapidly bring the sensitized device up to gain photocurrent.

Alternatively, as previously described above, the biasing light may be in imagewise configuration and thereby bring only imagewise configured portions of the device up to about the charge threshold for gain photocurrent. The gating light is then uniformly impinged upon the device and the portions of the device which were subjected to the imagewise configured biasing light are brought at least to the charge threshold for the onset of gain photocurrent.

Further, it is to be noted that the voltage source 5 in FIG. 2 is schematically illustrated as a D.C. voltage source. The advantageous gain photocurrent according to the practice of the present invention is provided only by the utilization of a direct current voltage source. An alternating current voltage source does not provide the gain photocurrent of the present invention because the oscillation of charges does not result in the buildup of the critical electrical field at $t_1$ (FIG. 1) required for the tunneling of electric charge through the insulating layer and the entire device. The voltage source 5 polarity is connected to the electrodes 1 and 4 in a manner that causes the more mobile charge carrier of the pairs of charge carriers created by excitation light impinging the photoconductive layer to move away from the insulating layer. That is, in FIG. 2, the polarity is connected such that the mobile charge carrier moves away from the electrode 1 and towards electrode 4. Thus, when the photoconductor utilized preferentially conducts positive charge then the negative polarity of voltage source 5 is connected to electrode 4; conversely, when the photoconductor employed preferentially conducts negative charges, then the positive polarity of the voltage source 5 is connected to electrode 4. It is to be noted that when the cholesteric Grandjean to focal-conic change is imagewise provided, care should be taken that the applied voltage is turned off subsequent to texture transformation in order to prevent a spreading of the image. That is, imagewise texture transformed regions of imaging layer 7 grow larger in time subsequent to their creation. Accordingly, it is preferred that the voltage be turned off at an appropriate time after the texture transformation. This growth is believed to be attributable to texture transformations of the non-image areas immediately adjacent the image areas.

The following examples define specific aspects of the present invention and include illustrations of various preferred embodiments thereof. Parts and percentages are by weight unless otherwise indicated.

EXAMPLE I

A gain photocurrent device is prepared as follows:

Glass substrates overcoated with a thin, transparent indium oxide conductive layer are utilized as electrodes 1 and 4. These electrodes are prepared by cleaning with a solution of Alcanox in an ultrasonic bath for about 30 minutes. This cleaning is followed by an about 5 minute rinsing in running hot water and then in an about 5 minute rinsing in running de-ionized water. The electrodes are subsequently air-dried for 1 hour in an oven at about 60° C.

A phenoxy insulating layer is next applied over the indium oxide layer of one of the electrodes by dip coating. The thickness of the phenoxy layer is controlled by varying the concentration of a phenoxy resin solution comprising 2-methoxyethyl acetate and methyl ethyl ketone. A 1 to 1 volume ratio of the two solvents is utilized and the phenoxy resin is added in an amount which constitutes about 0.3 weight percent of the resulting solution. The electrode to be coated is dipped in the solution and withdrawn at a rate of about 5.6 centimeter per minute. The resulting thickness of the phenoxy insulating layer is determined by multiple beam interferrometry, transmission electron microscopy, and U.V. absorption measurements to be about 100A.

An arsenic triselenide photoconductive layer is then deposited over the phenoxy insulating layer by vacuum evaporation. The phenoxy coated electrode is first baked out in a vacuum of about $1 \times 10^{-5}$ Torr by radiation heating at about 85° to about 90° C for about 1 hour. The arsenic triselenide is evaporated from a "Knudsen cell" type tantalum boat. The thickness of the photoconductor layer is controlled by the amount of photoconductive material placed in the boat. A revolving wheel to which the phenoxy coated electrode is attached is utilized during evaporation to ensure uniform thickness of the resulting photoconductor layer. During evaporation of the arsenic triselenide, the temperature of the phenoxy coated electrode is maintained at about 45° to about 50° C in order that the resulting photoconductive layer of arsenic triselenide has good appearance and mechanical properties. The amount of arsenic triselenide placed in the boat is such that the resulting photoconductive layer has a thickness of about $8\mu m$, determined by multiple beam interferrometric measurements.

Subsequently, a gold electrode is evaporated onto the free surface of the arsenic triselenide. The gold electrode in contact with the photoconductive layer is then connected to the negative terminal of a variable D.C. voltage source and the positive terminal thereof is connected to the electrode in contact with the phenoxy insulating layer.

EXAMPLE II

The procedure of Example I was followed to form gain photocurrent devices each of which comprised an insulating layer material different from that of other sample devices. In each of the sample devices, the electrodes are gold with the gold electrode adjacent the insulating layer being semi-transparent and about 50% transmissive to light whereas the gold electrode in contact with the photoconductive layer has a thickness of about 2,000A. In all samples, the incident light is at a wavelength of about 454 nm and at a flux of about $4.58 \times 10^{11}$ photons/cm²-sec; the photoconductive layer is arsenic triselenide and is about 10 microns thick; the insulating layer thicknesses are between about 200 and about 300A.

TABLE I

| Insulating Layer Material | $\sqrt{E} \times 10^{-2} (V/cm)^{1/2}$ where E = field across the insulating layer | Gain Photocurrent (A/cm²) |
|---|---|---|
| Phenoxy | 5.4 | $10^{-8}$ |
| Phenoxy | 9.2 | $7.5 \times 10^{-8}$ |
| Phenoxy | 13.9 | $4 \times 10^{-7}$ |
| poly(2-propene-2-anthracene) | 6.2 | $3.1 \times 10^{-8}$ |
| poly(2-propene-2-anthracene) | 7.8 | $2.9 \times 10^{-7}$ |
| poly(2-propene-2-anthracene) | 8.8 | $1.3 \times 10^{-6}$ |
| poly(2-vinyl-anthracene) | 5.3 | $3.5 \times 10^{-8}$ |
| poly(2-vinyl-anthracene) | 7.9 | $3.5 \times 10^{-7}$ |
| poly(2-vinyl-anthracene) | 8.7 | $8 \times 10^{-7}$ |

The above data is representative of that obtained from a while host of experiments on the three above-identified materials for the insulating layer. It is seen from the above representative data that the gain photocurrent does vary with the identity of the insulating material utilized in the insulating layer of the gain photocurrent device.

EXAMPLE III

The procedure of Example I is followed to produce a gain photocurrent device having the gold electrodes of Example II and a phenoxy insulating layer of a thickness of between 200 to about 300A. The gain photocurrent is measured as a function of the temperature at which the phenoxy material is maintained. The following data are representative of the data obtained.

TABLE II

| $\sqrt{E} \times 10^{-2} (V/cm)^{1/2}$ | Temperature (°K) | Gain Photocurrent (A/cm²) |
|---|---|---|
| 2 | 277.7 | $8.5 \times 10^{-10}$ |
| " | 294.1 | $3.4 \times 10^{-9}$ |
| " | 313.2 | $1.8 \times 10^{-8}$ |
| 10 | 277.7 | $3.7 \times 10^{-8}$ |
| " | 294.1 | $9.3 \times 10^{-8}$ |
| " | 313.2 | $2.8 \times 10^{-7}$ |
| " | 330.2 | $1.4 \times 10^{-6}$ |
| 14 | 277.7 | $2.5 \times 10^{-7}$ |
| " | 294.1 | $4.7 \times 10^{-7}$ |
| " | 313.2 | $1.1 \times 10^{-6}$ |
| " | 330.2 | $4.3 \times 10^{-6}$ |

The above representative data show that the gain photocurrent is dependent upon temperature.

EXAMPLE IV

The procedure of Example I and the electrodes and photoconductive layer of Example III are utilized in fabricating gain photocurrent device samples. In each sample, however, the insulating material is varied. An applied electrical field of about $1.5 \times 10^5$ V/cm is applied to each sample and the excitation light is at a wavelength of 454 nm at a flux of about $1.05 \times 10^{13}$ photons/cm²-sec.

TABLE III

| Insulating Layer Material | Insulating Layer Thickness (A) | Gain Photocurrent (A/cm²) |
|---|---|---|
| polyvinyl carbazole | 250 | $10^{-5}$ |
| A 70/30 weight percent co-polymer of styrene and n-butylmeth-acrylate | 913 | $5.6 \times 10^{-6}$ |
| A 65/35 weight percent co-polymer of styrene and n-butylmeth-acrylate | 653 | $9 \times 10^{-6}$ |
| LEXAN | 803 | $6.8 \times 10^{-6}$ |
| polystyrene | 845 | $4.5 \times 10^{-6}$ |

The above data demonstrate that the gain photocurrent does vary with the identity of the insulating material. A comprehensive review of all of the data obtained, however, demonstrates that the amount of gain photocurrent is not substantially affected by the thickness of the insulating layer for any given identity of insulating material utilized in the insulating layer.

EXAMPLE V

Experiments were conducted to determine whether the excitation light intensity has an effect on the gain photocurrent obtained. The procedure of Example I was followed to provide a gain photocurrent device having the gold electrodes of Example III and comprising a phenoxy insulating layer at a thickness of about 6500A, and a selenium photoconductive layer at a thickness of about 25 microns. The excitation light was at a wavelength of about 454 nm. The photon flux of the excitation light was varied and the primary and gain photocurrents observed were as follows: at a flux of $4 \times 10^{11}$ photons/cm$^2$-sec the primary current is measured to be about $4 \times 10^{-8}$ amps/cm$^2$ while the gain photocurrent is measured to be about $2.5 \times 10^{-7}$ amps/cm$^2$; at a flux of about $1.5 \times 10^{12}$ photons/cm$^2$-sec the primary current was measured to be about $10^{-7}$ amps/cm$^2$ and the gain photocurrent was measured to be about $5 \times 10^{-7}$ amps/cm$^2$; at a flux of about $4 \times 10^{12}$ photons/cm$^2$-sec the primary current was measured to be about $3 \times 10^{-7}$ amps/cm$^2$ and the gain photocurrent was measured to be about $1.5 \times 10^{-6}$ amps/cm$^2$; and, at a flux of about $1.2 \times 10^{13}$ photons/cm$^2$-sec the primary current was determined to be about $8 \times 10^{-7}$ amps/cm$^2$ and the gain photocurrent was determined to be about $3.5 \times 10^{-6}$ amps/cm$^2$.

This data shows a linear relationship between gain photocurrent and excitation light flux for a selenium photoconductive layer.

EXAMPLE VI

The procedure of Example I is utilized to provide a gain photocurrent device having the gold electrodes of Example III and comprising a phenoxy insulating layer at a thickness of about 100A and an arsenic triselenide photoconductive layer at a thickness of about 8 microns. The applied electrical field is at about $1.5 \times 10^5$ V/cm and the excitation light is at a wavelength of about 498 nm. The primary current and gain photocurrent were measured as a function of varying excitation light flux. The following data are representative of the data obtained: at a flux of about $10^{12}$ photons/cm$^2$-sec, the primary current was measured to be about $1.3 \times 10^{-7}$ amps/cm$^2$ and the gain photocurrent was measured to be about $1.8 \times 10^{-6}$ amps/cm$^2$; at a flux of about $8 \times 10^{12}$ photons/cm$^2$-sec, the primary current was measured to be about $9 \times 10^{-7}$ amps/cm$^2$ and the gain photocurrent was observed to be about $6.5 \times 10^{-6}$ amps/cm$^2$; and, at a flux of about $1.6 \times 10^{13}$ photons/cm$^2$-sec the primary current was measured to be about $1.5 \times 10^{-}$ amps/cm$^2$ and the gain photocurrent was measured to be about $1.8 \times 10^{-6}$ amps/cm$^2$.

A comprehensive review of the complete set of data indicates that for arsenic triselenide the primary current varies linearly with the flux or intensity of the excitation light but that the gain photocurrent is proportional to the square root of the light intensity. It is further indicated as one skilled in the art might expect, that the gain photocurrent varies with the identity of the photoconductive material. For example, it is noted that the arsenic triselenide photoconductive layer provides about four times as much gain photocurrent as the selenium photoconductive layer although its electrical field in only about one-half the strength of that utilized in the device containing the selenium photoconductive layer. This is not attributable to the difference in thicknesses between the phenoxy insulating layers utilized in the two gain photocurrent devices as will be seen in Example VII, below.

EXAMPLE VII

The procedure of Example I is utilized to provide gain photocurrent devices having the gold electrodes of Example III, phenoxy insulating layers of various thicknesses, and a photoconductive layer thickness of about 6 microns. Two sets of samples are made wherein the first set comprises arsenic triselenide and the second set comprises selenium, as the photoconductive layers. Each set of devices contains phenoxy insulating layers varying from about 10 to about 7000A in thickness. The first set of devices containing the arsenic triselenide photoconductive layer have an electrical field applied at a strength of about $1.5 \times 10^5$ V/cm whereas the second set of devices comprising the selenium photoconductive layers have an electrical field applied at a strength of about $4 \times 10^5$ V/cm. The excitation light utilized in operating both sets of devices is at a wavelength of about 454 nm and at a flux of about $1.05 \times 10^{13}$ photons/cm$^2$-sec. Gain photocurrent is observed in the arsenic triselenide devices for phenoxy layers ranging from about 10 to about 3000A in thickness and the measured gain photocurrent is observed to be within the range from about $4 \times 10^{-6}$ amps/cm$^2$ to about $2 \times 10^{-5}$ amps/cm$^2$ and therefore varies little over a wide range of insulator thicknesses. It is especially noteworthy that gain photocurrent is observed in the arsenic triselenide devices with an insulation layer as thick as about 3000A.

The set of devices containing the selenium photoconductive layers exhibit photocurrent gain with insulating layers having thicknesses from about 10 to about 7000A.

Tha gain photocurrent is measured for these thicknesses to be within the raange of from about $2.8 \times 10^{-6}$ amps/cm$^2$ to about $7 \times 10^{-6}$ amps/cm$^2$. Again, the gain photocurrent varies little over a wide range of insulator thicknesses. Again, it is especially noteworthy that gain photocurrent was observed in devices comprising the selenium photoconductive layer and having insulating layer thicknesses as great at about 7000A.

EXAMPLE VIII

The procedure of Example I is followed to provide gain photocurrent devices for studying the effect of an applied electrical field on the resulting gain photocurrent. The devices comprise an indium oxide coated glass substrate as a semi-transparent anode overcoated with an about 400A thick phenoxy insulating layer which, in turn, is coated with an about 6.2 micron thick arsenic triselenide photoconductive layer. The cathode in contact with the photoconductive layer is an aluminum electrode. During operation of the devices, excitation light at a wavelength of about 454 nm and at a flux of about $1.05 \times 10^{13}$ photons/cm$^2$-sec is utilized. The voltage, and therefore the applied field, is set at variable settings and at each setting the resulting measured primary current and gain photocurrent are measured. The primary current tends to saturate at approximately $1.1 \times 10^{-6}$ amps/cm², corresponding to a quantum efficiency of about 0.73. The gain photocurrent shows no sign of saturation and increases proportionally to the square of the applied electrical field. Data representative of the complete set of data upon which the foregoing observations were made include the following: at an applied field of about $4 \times 10^4$ volts/cm, the measured primary current is $7 \times 10^{-7}$ amps/cm² and the gain photocurrent is measured to be about $1.3 \times 10^{-6}$ amps/cm²; at an applied electrical field strength of about $10^5$ V/cm, the primary current is measured at about $10^{-6}$ amps/cm² and the gain photocurrent is measured to be about $7.5 \times 10^{-6}$ amps/cm²; and at an applied field strength of about $2 \times 10^5$ V/cm. the primary current is measured to be about $10^{-6}$ amps/cm² and the gain photocurrent is measured to be about $3 \times 10^{-5}$ amps/cm².

EXAMPLE IX

The electro-optic device of FIG. 2 is prepared according to the procedure of Example I to provide an imaging device comprising the indium oxide coated electrode of Example VIII overcoated with a phenoxy insulating layer at a thickness of about 100A, the phenoxy insulating layer being overcoated with an about 8.5 micron thick arsenic triselenide photoconductive layer, and the photoconductive layer being overcoated with an about 13 micron thick cholesteric liquid crystalline layer in the Grandjean texture and another indium oxide coated electrode in contact with the free side of the cholesteric liquid crystalline layer. A voltage of about 100 volts is applied to the device with the electrode 4 electrically connected to the negative terminal of the voltage source and the indium oxide coated electrode 1 connected to the positive terminal of the voltage source. The voltage source is a D.C. voltage. The cholesteric liquid crystalline composition utilized in the liquid crystalline layer comprises 80 weight percent p-methoxy-benzylidene-p-n-butylaniline (MBBA) and 20 weight percent cholesteryl oleyl carbonate (COC). The device active area is about 4 cm².

An excitation light having a wavelength of about 9.2 $\times 10^{13}$ photons/cm²-sec incident on the phenoxy side of the device through the indium oxide coated electrode is utilized. After application of the voltage, exposures of about 14 msec pulse duration are given at intervals of about 20 seconds, and the current is measured at each exposure. The first exposure pulse produces a peak current of about $13.5 \times 10^{-6}$ amps which returns to a dark current level of below about $0.1 \times 10^{-6}$ amps within about 100 msec. The second, third, and fourth pulse produce no significant change. However, at the fifth excitation pulse, the dark current after the light excitation begins to show some increase in magnitude and duration prior to returning to a level below about $0.1 \times 10^{-6}$ amps. The sixth excitation pulse produces a significant increase in magnitude and duration of the dark current. This phenomena indicated that each excitation pulse generates trapped electrons at the phenoxy/arsenic triselenide interface which are stable under the applied electric field. Apparently, as more pulsed exposures are give, trapped electrons acuumulate at the phenoxy/arsenic triselenide interface; hence the electrical field across the phenoxy insulating layer keeps increasing. Eventually the electrical field enhancement becomes high enough for the injection of positive charges or holes to become significant. The total negative charge accumulated at the phenoxy/arsenic triselenide interface after the fifth light pulse as calculated from the total charge flow per light pulse in these experiments is found to be about $0.65 \times 10^{-6}$ coulomb/cm². This value agrees very well with the average critical charge, or total charge of primary current prior to the onset of gain photocurrent or secondary current, noted in Table IV below.

These observations and correlations made in this Example IX indicate that the excitation light need not necessarily be continuously impinging on the photoconductive layer prior to onset of secondary current or gain photocurrent, but that pulsed light can be utilized to initiate the onset of gain photocurrent. Mechanistically, the observations and correlations indicate that trapping of charges does indeed occur at the interface between the insulating layer and photoconductive layer.

EXAMPLE X

The imaging device with the imaging layer of Example IX is subjected to a steady relatively low intensity illumination at a wavelength of about 545 nm and at a flux below $10^{12}$ photons/cm²-sec., during the application of about 220 D.C. volts. The intensity of the excitation light is insufficient to produce a gain photocurrent within a few seconds and the primary photocurrent is insufficient to cause texture transformation of the cholesteric liquid crystalline layer from the Grandjean texture to the focal-conic texture. The voltage and excitation light are turned off. While the voltage is re-applied, the device is exposed to a strobe light pulse at an incident intensity at about $8 \times 10^{12}$ photons/cm² pulse at about 545 nm. The intensity of the strobe light pulse is insufficient to produce a gain photocurrent and the primary current produced is insufficient to cause texture transformation of the cholesteric liquid crystalline layer. The voltage is turned off.

The voltage is re-applied and the device is then illuminated with the steady low intensity illumination and the strobe light is pulsed once, the combined illumination providing total incident photons of at least about 9 $\times 10^{12}$ photons/cm². The two exposures together substantially immediately (i.e., within a fraction of a second) generate a gain photocurrent, and the resultant current is sufficiently high to cause a texture transformation in the cholesteric liquid crystalline layer from the Grandjean texture to the focal-conic texture.

EXAMPLE XI

The device and simultaneous exposure of Example X is followed; however, the strobe light is passed through an imagewise configured mask which permits only imagewise configured strobe light to impinge the device. The cholesteric liquid crystalline layer is transformed in texture from the Grandjean to the focal-conic texture in imagewise configuration corresponding to the imagewise configured strobe light impinging the device.

EXAMPLE XII

Example X is followed except that the low intensity illumination is in imagewise configuration and the strobe light uniformly impinges the device.

EXAMPLE XIII

The electro-optic device of Example IX is provided. A voltage of about 200 volts D.C. is utilized. The aluminum electrode is electrically connected to the negative terminal of the voltage source and the indium oxide coated electrode is electrically connected to the positive terminal of the voltage source.

The cholesteric liquid crystalline composition utilized in the liquid crystalline layer comprises about 80 weight percent MBBA and about 20 weight percent COC.

A biasing light having a wavelength at about 545 nm at a flux of about $10^{13}$ photons/cm$^2$-sec impinges the device uniformly through the indium oxide coated electrode for about 600 msec.

An about 200 msec pulse of gating light having a wavelength of about 545 nm and a flux of about $10^{13}$ photons/cm$^2$-sec is directed to impinge the device through the indium oxide coated electrode in an imagewise configuration. The liquid crystalline layer images in imagewise configuration corresponding to the configuration of the imagewise configured gating light. The voltage is turned off.

EXAMPLE XIV

Example XIII is repeated except that the biasing light does not uniformly impinge the device but rather is in imagewise configuration and the gating light is not in imagewise configuration but rather uniformly impinges upon the device. The same sequence of steps leads to the same observations made in Example XIII.

EXAMPLE XV

Example XIII is repeated except that the biasing light is omitted. The liquid crystalline layer does not image.

EXAMPLE XVI

Example XIII is repeated except that the gating light is omitted. The liquid crystalline layer does not image.

In further elaboration of the independent nature of the charge threshold for gain photocurrent with respect to light intensity the following data in Table IV, below, is presented. These results were obtained on a device having an about 8μm thick arsenic triselenide photoconductive layer and an about 100A phenoxy insulating layer. The wavelength of excitation light utilized was at about 498 nm. The only parameter varied is that of incident light flux.

TABLE IV

| Incident Light Flux (photons/cm$^2$-sec) | Primary Current (μA/cm$^2$) | $t_1-t_0$ (sec) | Pre-Gain Total Charge (μC/cm$^2$) |
|---|---|---|---|
| 9.26×10$^{11}$ | 0.12 | 4.90 | 0.59 |
| 1.77×10$^{12}$ | 0.21 | 2.84 | 0.60 |
| 2.80×10$^{12}$ | 0.32 | 1.82 | 0.58 |
| 5.33×10$^{12}$ | 0.52 | 1.10 | 0.57 |
| 8.45×10$^{12}$ | 0.91 | 0.67 | 0.61 |
| 1.61×10$^{13}$ | 1.46 | 0.42 | 0.61 |

The tabulated data in Table V demonstrates that the gain photocurrent varies significantly with the work function of the electrodes. These data were taken on a device comprising an about 8μm thick layer of arsenic triselenide as the photoconductive layer and an about 100A thick phenoxy layer as the insulating layer. The applied potential was at a strength of about $10^5$ V/cm. the excitation light incident on the device was at a wavelength of about 454 nm and at a flux of about 2 × $10^{12}$ photons/cm$^2$-sec.

TABLE V

| Electrode Material | Gain Photocurrent (μA/cm$^2$) | Work Function (eV) |
|---|---|---|
| Aluminum | 2.7×10$^{-7}$ | 4.0 |
| Silver | 5.2×10$^{-7}$ | 4.3 |
| Copper | 6.0×10$^{-7}$ | 4.6 |
| Tin Oxide | 1.5×10$^{-6}$ | 4.8 |
| Gold | 1.6×10$^{-6}$ | 5.0 |

The data of Table V, above, demonstrates that the gain photocurrent varies significantly with the work function of the electrode material. Table V also further illustrates the general statement previously made that the characteristics of the photoconductor layer, insulating layer and electrodes should be matched in order to obtain even larger gain photocurrents. It will be noted that the photoconductive material utilized in the device from which the Table V data was obtained was arsenic triselenide, an alloyed photoconductor, which we indicated typically preferentially conducts positive charge or holes. Accordingly, we previously indicated that where the photoconductive material exhibited this characteristic, the electrode material should be selected to have a high work function. From Table V it can be seen that the higher the work function of the electrode material, the higher the gain photocurrent.

It will be appreciated that other variations and modifications will occur to those skilled in the art upon a reading of the present disclosure. These are intended to be within the scope of this invention.

What is claimed is:

1. A method of changing at least one characteristic of a layer of liquid crystalline composition, said characteristic being responsive to applied voltage, comprising:
   a. providing a sandwiched structure comprising, in turn, a first electrode, an insulating layer, a photoconductive layer, said layer of liquid crystalline composition, and a second electrode; the thickness ratio of said photoconductive layer to said insulating layer being at least about 10 to 1;
   b. applying a D.C. voltage across said insulating, photoconductive and liquid crystalline layers;
   c. impinging said photoconductive layer with biasing light having a wavelength within the fundamental absorption band of said photoconductive layer wherein a primary photocurrent is excited with said photoconductive layer;
   d. removing said biasing light at about the charge threshold for gain photocurrent within said photoconductive layer; and
   e. after a non-zero time interval impinging said photoconductive layer with a gating light having a wavelength within the fundamental absorption band of said photoconductive layer and which excites a primary photocurrent within said photoconductive layer sufficient to provide a total primary photocurrent charge accumulation above the charge threshold for gain photo current within said photoconductive layer.

2. The method of claim 1 wherein said photoconductive layer comprises a photoconductive material which preferentially conducts negative charge.

3. The method of claim 2 wherein said insulating layer comprises an insulating material having an electron affinity greater than about 1.5 eV.

4. The method of claim 3 wherein at least one of said electrodes comprises a material having a work function of less than about 4.5 eV.

5. The method of claim 4 wherein said at least one electrode is adjacent the insulating layer.

6. The method of claim 5 wherein said at least one electrode comprises material selected from the group consisting of silver, indium, tin and aluminum.

7. The method of claim 1 wherein said photoconductive layer comprises photoconductive material which preferentially conducts positive charge.

8. The method of claim 7 wherein said insulating layer comprises an insulating material having an ionization potential less than about 8 eV.

9. The method of claim 8 wherein at least one of said electrodes comprises a material having a work function greater than about 4.5 eV.

10. The method of claim 9 wherein said at least one electrode is adjacent said insulating layer.

11. The method of claim 10 wherein said at least one electrode comprises a material selected from the group consisting of platinum, copper, gold, tin oxide, and indium oxide.

12. The method of claim 1 wherein said layer of liquid crystalline composition comprises a material selected from the group consisting of nematic liquid crystalline materials, cholesteric liquid crystalline materials and mixtures of cholesteric liquid crystalline materials with nematic or smectic liquid. crystalline materials.

13. The method of claim 1 wherein said layer of liquid crystalline composition comprises about 80% by weight p-methoxy-benzylidene-p-n-butylaniline and about 20% by weight cholesteryl oleyl carbonate.

14. The method of claim 13 wherein said total primary photocurrent charge accumulation above the charge threshold for gain photocurrent is continued for a period of time sufficient to cause said imaging layer to undergo transformation from the Grandjean texture to the focal conic texture.

15. The method of claim 14 wherein one of said biasing light and gating light is in imagewise configuration and the other of said biasing light and gating light uniformly impinges said photoconductive layer, wherein the Grandjean to focalconic texture transformation occurs in imagewise configuration.

16. The method of claim 15 further including the step of removing the D.C. voltage subsequent to the imagewise texture transformation.

17. The method of claim 1 wherein said gating light is provided by a cathode ray tube.

18. A method of imaging, comprising:
a. providing, in turn, in sandwich configuration, a first electrode, an insulating layer, a photoconductive layer, a layer of liquid crystalline composition having the optical characteristics of the cholesteric mesophase in the Grandjean texture, and a second electrode; the thickness ratio of said photoconductive to insulating layer being at least about 10 to 1;
b. applying a D.C. voltage across said insulating; photoconductive and liquid crystalline layers;
c. impinging said photoconductive layer with a biasing light having a wavelength within the fundamental absorption band of said photoconductive layer wherein a primary photocurrent is excited within said photoconductive layer;
d. removing said biasing light at about the charge threshold for gain photocurrent within said photoconductive layer; and
e. impinging said photoconductive layer with gating light having a wavelength within the fundamental absorption band of said photoconductive layer and which excites a primary photocurrent within said photoconductive layer sufficient to provide a total primary photocurrent charge accumulation above the charge threshold for gain photocurrent within said photoconductive layer; one of said biasing light and said gating light being in imagewise configuration and the other of said biasing light and gating light impinging said photoconductive layer uniformly.

19. The method of claim 18 wherein said gating light is in imagewise configuration.

20. The method of claim 19 wherein said imagewise configured gating light is provided by a cathode ray tube.

21. The method of claim 18 wherein said photoconductive layer comprises photoconductive material which preferentially conducts positive charge.

22. The method of claim 21 wherein said insulating layer comprises an insulating material having an ionization potential less than about 8 eV.

23. The method of claim 22 wherein at least one of said electrodes comprises a material having a work function greater than about 4 eV.

24. The method of claim 23 wherein said at least one electrode is adjacent said insulating layer.

25. The method of claim 24 wherein said at least one electrode comprises a material selected from the group consisting of platinum, copper, gold, tin oxide and indium oxide.

26. The method of claim 18 wherein said liquid crystalline composition comprises about 80% by weight p-methoxy-benzylidene-p-n-butylaniline and about 20% by weight cholesteryl oleyl carbonate.

27. The method of claim 26 wherein said insulating layer comprises an insulating material selected from the group consisting of phenoxy resin, poly (2-propeneanthracene), poly (2-vinyl-anthracene) and poly [1-(2-anthryl)ethylmethacrylate].

28. The method according to claim 1 wherein said insulating layer is an organic insulating layer.

29. A method of changing at least one characteristic of a layer of liquid crystalline composition, said characteristic being responsive to applied voltage, comprising:
a. providing a sandwich structure comprising, in turn, a first electrode, an insulating layer, a photoconductive layer, said layer of liquid crystalline composition, and a second electrode; the thickness ratio of said photoconductive layer to said insulating layer being at least about 10 to 1;
b. applying a D.C. voltage across said insulating photoconductive and liquid crystalline layers;
c. impinging said photoconductive layer with biasing light having a wavelength within the fundamental absorption band of said photoconductive layer wherein a primary photocurrent is excited within said photoconductive layer;
d. removing said biasing light at about the charge threshold for gain photocurrent within said photoconductive layer; and
e. impinging said photoconductive layer with a gating light having a wavelength within the fundamental absorption band of said photoconductive layer and which excites a primary photocurrent within said photoconductive layer sufficient to provide a total primary photocurrent charge accumulation above the charge threshold for gain photocurrent within said photoconductive layer; said biasing light being in imagewise configuration and said gating light impinging said photoconductive layer in at least one area previously struck by said biasing light.

30. A method of changing at least one characteristic of a layer of liquid crystalline composition, said characteristic being responsive to applied voltage, comprising:
  a. providing a sandwiched structure comprising, in turn, a first electrode, an insulating layer, a photoconductive layer, said layer of liquid crystalline composition, and a second electrode; the thickness ratio of said photoconductive layer to said insulating layer being at least about 10 to 1;
  b. applying a D.C. voltage across said insulating, photoconductive and liquid crystalline layers;
  c. impinging said photoconductive layer with biasing light having a wavelength within the fundamental absorption band of said photoconductive layer wherein a primary photocurrent is excited within said photoconductive layer;
  d. removing said biasing light at about the charge threshold for gain photocurrent within said photoconductive layer; and
  e. impinging said photoconductive layer with a gating light having a wavelength within the fundamental absorption band of said photoconductive layer and which excites a primary photocurrent within said photoconductive layer sufficient to provide a total primary photocurrent charge accumulation above the charge threshold for gain photocurrent within said photoconductive layer; said biasing light impinging said photoconductive layer uniformly and said gating light being in imagewise configuration.

* * * * *

UNITED STATES PATENT AND TRADEMARK OFFICE
CERTIFICATE OF CORRECTION

PATENT NO. : 3,944,332
DATED : March 16, 1976
INVENTOR(S) : Simpei Tutihasi and Kyler F. Nelson It is certified that error appears in the above–identified patent and that said Letters Patent are hereby corrected as shown below:

Column 1, line 22: "Electrophotography" should read --Electrophotography--.

Column 2, line 24: "following" should read --foregoing--.

Column 2, line 34: "photoconductorinsulator" should read -- photoconductor-insulator --.

Column 9, line 48: "baasing" should read --biasing--.

Column 11, line 8: "trisel enide" should read --triselenide--.

Column 15, line 63: "acuumulate" should read --accumulate--.

Signed and Sealed this

Thirty-first Day of August 1976

[SEAL]

Attest:

RUTH C. MASON
Attesting Officer

C. MARSHALL DANN
Commissioner of Patents and Trademarks